United States Patent
Ames

(12) 
(10) Patent No.: US 7,009,597 B1
(45) Date of Patent: Mar. 7, 2006

(54) POSITIONING CONTROL OF A COMPUTER MOUSE

(75) Inventor: Irving Ames, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,734

(22) Filed: Jun. 10, 1999

(51) Int. Cl.
*G09G 5/08* (2006.01)

(52) U.S. Cl. ...................... 345/163; 345/157
(58) Field of Classification Search ........ 345/163–166, 345/157, 161
See application file for complete search history.

(56) References Cited

U.S. PATENT DOCUMENTS

| | | | |
|---|---|---|---|
| 4,628,755 A * | 12/1986 | Hawley | 74/471 XY |
| 4,751,505 A * | 6/1988 | Williams et al. | 345/166 |
| 4,868,549 A * | 9/1989 | Affinito et al. | 345/164 |
| 5,642,131 A | 6/1997 | Pekelney et al. | 345/145 |
| 5,776,585 A * | 7/1998 | Fukuhara et al. | 428/141 |
| 5,828,364 A * | 10/1998 | Siddiqui | 345/163 |
| 6,172,665 B1 * | 1/2001 | Bullister | 345/163 |

* cited by examiner

*Primary Examiner*—Alexander Eisen
(74) *Attorney, Agent, or Firm*—Thomas A. Beck; Daniel P. Morris

(57) ABSTRACT

Control in the positioning of a computer mouse is improved by adding a finely adjusted frictional force component to relative motion in the plane of the mouse-supporting surface, or mouse pad, system. The added frictional force component operates to produce a drag component that dampens the movement. The added frictional force component may be provided by additional small localized weight increments, the effect of a magnetic field, or a change in coefficient of friction between parts that move in relation to each other, as examples.

5 Claims, 2 Drawing Sheets

POSITIONING CONTROL OF A COMPUTER MOUSE

FIELD OF THE INVENTION

The invention is directed to manual guidance by the user in control of a computer through a display interface, and in particular to the positioning of a cursor in the display by the movement of a computer mouse and further in particular to the addition of a frictional force component in the mouse movement that improves positioning control and efficiency.

BACKGROUND OF THE INVENTION AND RELATION TO THE PRIOR ART

As progress evolves in the control of a cursor through a display interface of a computer a number of considerations are operating to make accuracy in positioning and in turn user efficiency, increasingly difficult to achieve. In the art, a positioning device called a mouse has evolved that fits in the hand of the user and which has a rotatable element on the under side that rotates against the surface on which the mouse rests when the mouse is moved. The mouse internally has circuitry that provides and transmits signals correlated with the rotatable element movement that results in movement of the cursor or pointer on the display screen.

Switching elements that deliver operating system signals through the mouse-display interface can impose psychomotor limitations for a user. The switches are positioned to be under an adjacent finger when the mouse is in the hand of the user but the actuation force for each switch by the respective finger has force components in more than one direction that can introduce a movement force on the mouse that may disrupt the position of the mouse and in turn the cursor. Other users may have other types of hand coordination problems, making it difficult for them to reach and retain targeted locations with a mouse. Complexity is further added by operating system requirements for such actuation features as "double clicks". Complexity is still further added by the fact that some users as their experience and skills change could benefit by having some adjustability in the movement response of the mouse.

Operating system controls that are installed to introduce system biases favoring a particular user such as are discussed in U.S. Pat. No. 5,642,131 also recognize that accurate cursor positioning directly to a particular desired location is inefficient because when the user is able to position the cursor close to the desired location overshoot and undershoot make precise positioning of the cursor difficult. Maneuvering the cursor directly to the desired location must be done with care, requiring slower action, which in turn affects productivity and efficiency.

SUMMARY OF THE INVENTION

In the invention, positioning control of a computer mouse is improved by adding a finely adjustable frictional force component to relative motion in the plane of the mouse-supporting surface, or mouse pad, system. The added frictional force component operates to produce a drag component that dampens any forces that would tend to upset the selected mouse position. The frictional force component may be provided, for example by additional small localized weight increments, the effect of a magnetic field or a change in coefficient of friction between parts that move in relation to each other.

DESCRIPTION OF THE INVENTION

In the invention, there is added an adjustable frictional force component in the mouse—mouse pad type supporting surface that improves the positioning control of the mouse by introducing an adjustable drag-type component to the mouse movement in the plane of the mouse—mouse pad interface.

Figure 1:
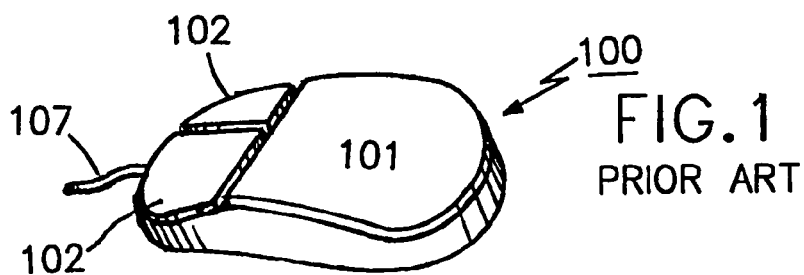
FIGS. 1 and 2 are perspective and side views respectively of a typical prior art computer mouse.
Figure 2:
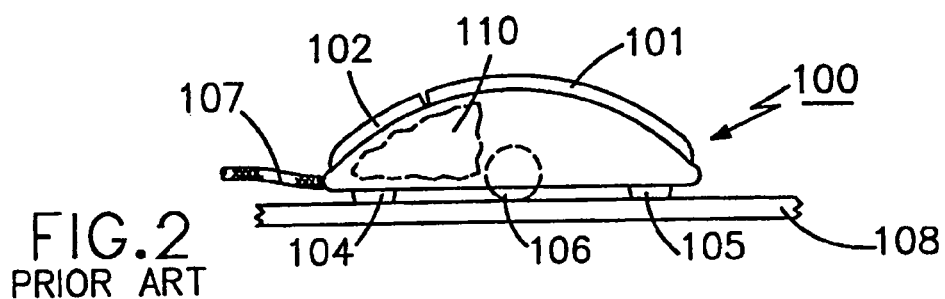

The structural features of a typical mouse are illustrated in connection with FIGS. 1 and 2 which are perspective and side views respectively and which are labelled prior art. Referring to FIG. 1 and FIG. 2. together; the mouse 100 has a housing that generally fits the hand of the user with the upper curved surface 101 fitting into the heel of the right hand or the left hand of a left handed user. Switches 102 and 103 are provided for the standard clicking functions of the computer and are positioned for actuation by the index and middle fingers of the user. Protrusions 104 and 105, which are usually of plastic, provide frictional sliding surfaces for the mouse. A curved member with a peripheral surface such as a sphere 106 is rotated by tangential contact of the peripheral surface of the sphere in movement of the mouse over the supporting surface. Position sensing mechanisms and circuitry indicated generally as element 110 within the housing of the mouse 100 convert the motion of the sphere 106 into signals for the computer, resulting in motion of the pointer, or cursor, on a display screen, not shown. The position signals are delivered to the computer through the cable 107 or transmitted by a standard in the art, transmitter, not shown, within the housing of the mouse 100. The mouse 100 has movement in the plane of a supporting surface 108, which is typically a mouse pad 108, which serves as a resilient and uniform friction supplying, supporting surface. For simplicity of description, the supporting surface 108 will be referred to as the mouse pad.

The frictional forces between the lower surfaces of the protrusions 104 and 105 and the upper surface of the mouse pad 108 can be increased by increasing the weight of the mouse. At the present state of the art, the weight of a mouse can be about 100 grams or about 3½ ounces. But at that weight, while light enough to avoid hand fatigue, difficulty in positioning can be encountered.

In accordance with the invention, a fine adjustment in frictional force between the mouse and the supporting surface on which it rests can make a difference between improving positioning accuracy while avoiding hand fatigue. The adjustment in frictional force can be provided in many ways including as examples: by the addition of incremental weights and the removal of some if necessary until an optimum overall weight is achieved; by the introduction of a magnetic field perpendicular to the supporting surface, between the mouse and a supporting surface; or by a change in the coefficient of friction in the mouse-supporting surface interface such as at the mouse support protrusions; or by any combination thereof.

Figure 3:
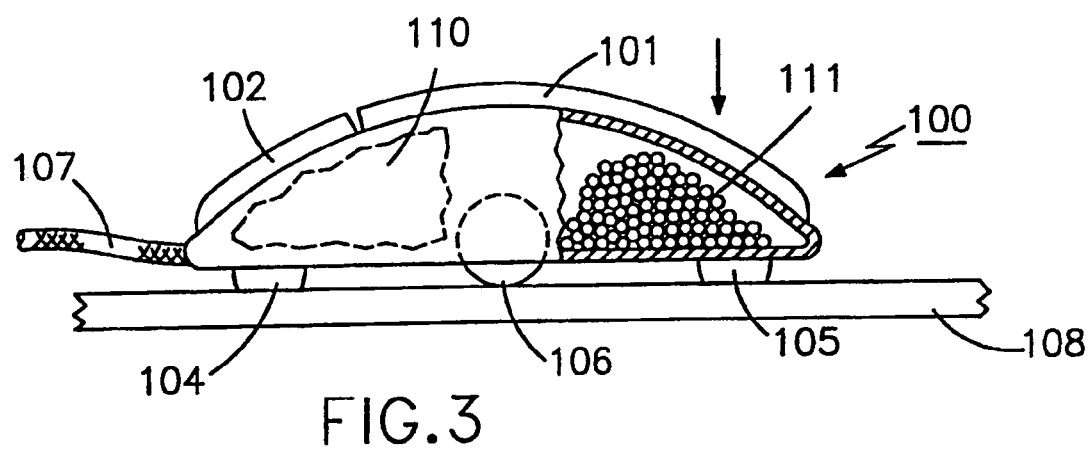
FIGS. 3 and 4 are each a schematic side view of different embodiments of the invention illustrating the addition of positioned mouse housing weight increments.
Figure 4:
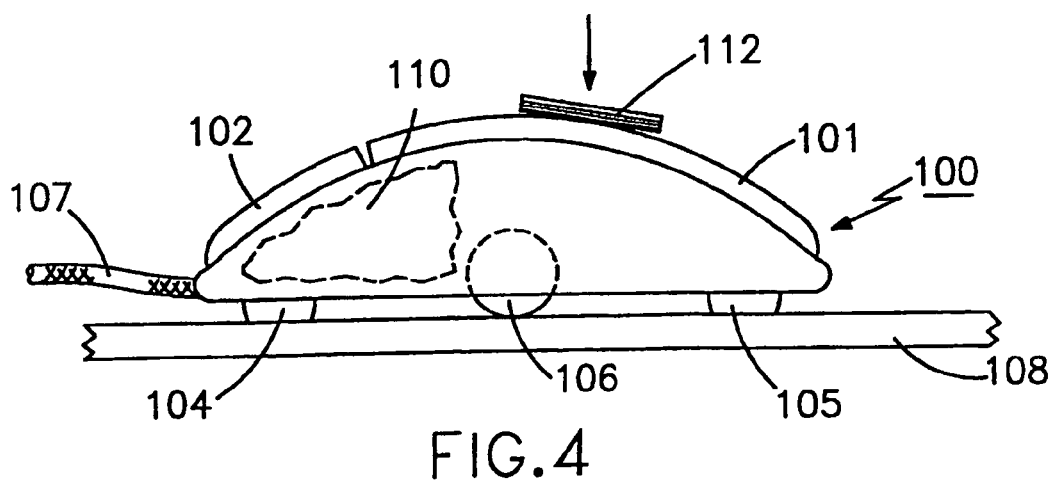

Referring to FIGS. 3 and 4 which are each a schematic side view of different embodiments of the invention illustrating the addition of a selectively positioned mouse housing weight increment of the order of about 20 to 50 grams, which is less than about half the total weight of a typical mouse and which operates to adjust the frictional force in movement between the mouse 100 and the pad or supporting surface 108.

In the embodiment of FIG. 3, where like reference numerals are used as in previous figures, the frictional force between the mouse 100 and the mouse pad 108 is adjustably increased by placing a localized group of small metal pellets 111 having a total weight of about 20 to 50 grams into the mouse housing. The weight of the group of pellets 111 is partially balanced by that of the position sensing circuitry 110 which is usually present in the vicinity of the protrusion 104. The pellets 111 typically may have a diameter of about ⅛ inch, similar to buck shot. They are usually placed into the housing after first having been placed into a small plastic wrapper to prevent their scattering to the mechanical and electrical components when inside the housing.

In the embodiment of FIG. 4, where like reference numerals are used as in previous figures, the frictional force for movement between the mouse 100 and the mouse pad 108 is adjustably increased by placing an affixed weight member 112 having a total weight of about 20 to 50 grams over the 101 portion of the housing. 100. The weight member 112 may consist for example of one or a plurality of about 1 inch diameter metal discs that are cloth or plastic covered.

Figure 5:
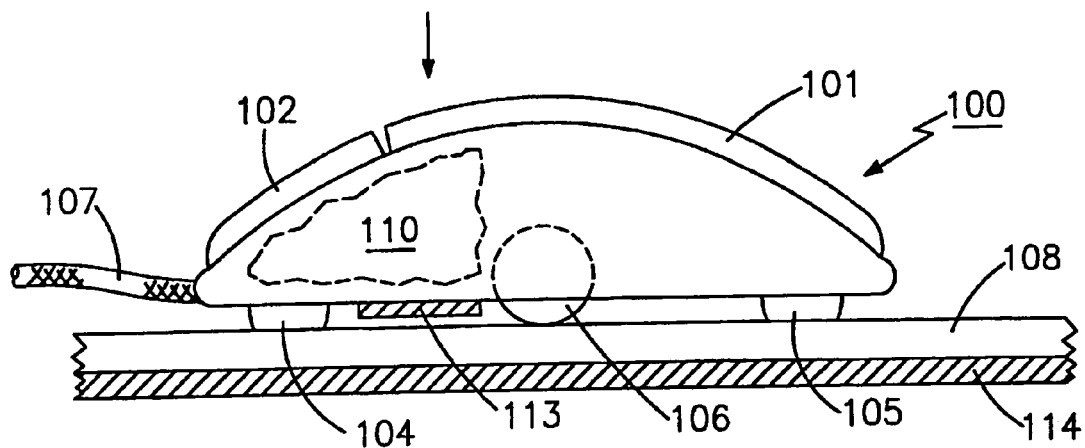
FIGS. 5 and 6 are each a schematic side view of different embodiments of the invention illustrating the use of a magnetic member on the mouse housing providing attraction to a mouse pad type supporting surface containing a ferromagnetic sheet member.
Figure 6:
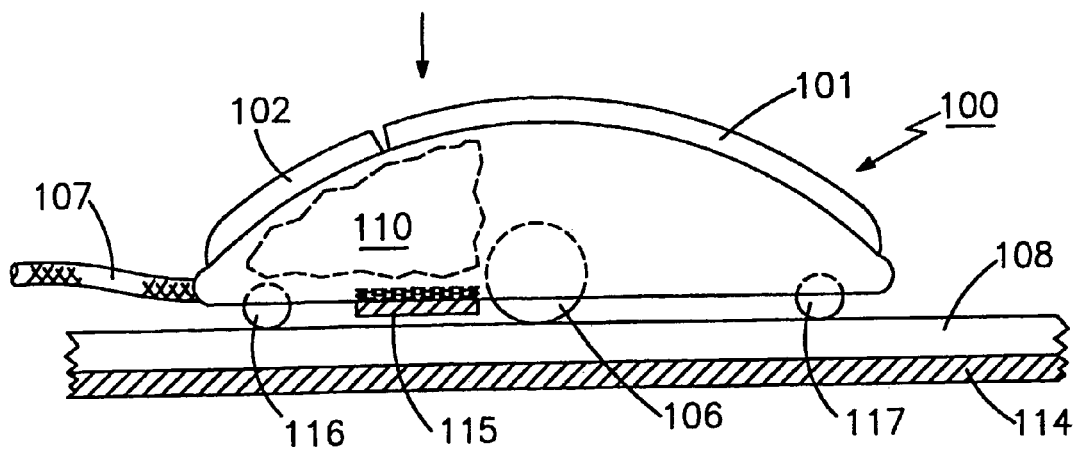

FIGS. 5 and 6 are each a schematic side view of different embodiments of the invention illustrating the use of a magnetic member on the mouse housing providing attraction to an underlying ferromagnetic sheet within the mouse pad.

Referring to FIG. 5, where like reference numerals are used as in previous figures, use is made of a localized magnetic field to add frictional force to the motion of the mouse with respect to the mouse pad. FIG. 5 depicts the side view of the mouse 100 that with a permanent magnet element 113 affixed to the portion of the mouse 100 adjacent to the mouse pad 108 in the vicinity of protrusion 104. The permanent magnet may be a small portion of magnetic sheet material of the type that adheres to steel surfaces by magnetic attraction. The mouse pad 108 contains a sheet of steel or some other ferromagnetic material 114 with a cover such as a cloth. The magnetic attraction between the permanent magnet 113 and the ferromagnetic sheet 114 in the mouse pad 108 increases the downward force, thereby increasing the frictional force in the relative movement between the mouse 100 and the mouse pad 108, resulting in increased mechanical resistance to any intermittent and unintended the motion of the mouse. In this embodiment, adjustment ability is achieved by reducing or increasing the area and/or thickness of the affixed magnetic element 113.

In FIG. 6 another embodiment is provided of the use of a localized magnetic field to provide the added frictional force. In the embodiment of FIG. 6, the arrangement is also one that is particularly suitable for use in portable and mobile environments. For optimum use in such environments, the mouse is typically cordless in which the cable 107 in previous figures is replaced by a transmitter located in the circuitry 110. The mouse pad 108 includes a coated or cloth-covered rigid sheet of steel or another ferromagnetic material 114. The magnetic field is provided by means of a relatively strong permanent magnet 115 such as, for example, a ½ inch diameter disc of SmCo that is screw mounted for adjustment to vary the spacing between the magnet 115, through the mouse pad 108 cover to the ferromagnetic material 114. The less the spacing, the greater will be the magnetic attraction. Where the magnetic attraction is increased sufficiently to support the mouse without detachment from its rigid mouse pad over a range of spatial orientations and/or accelerations, the result may be too much frictional force being added to enable comfortable use of the mouse. Such a problem is overcome by providing rollers in place of the usual protrusions. Two such rollers 116 and 117 are indicated in FIG. 6.

The combination of weight or magnetic attraction is illustrated symbolically in FIGS. 3–6 as an arrow.

Another general way to introduce a frictional force requirement into the interface between between the mouse 100 and the mouse pad 108 is to change the coefficient of friction between mating surfaces. Such an approach is illustrated in connection with FIG. 7 which is a schematic side view of an embodiment of the invention illustrating the addition of increased friction surfaces to the sliding support faces; this operates to increase the static and kinetic coefficients of friction between the support faces of the mouse 100 and the mouse pad 108.

Figure 7:
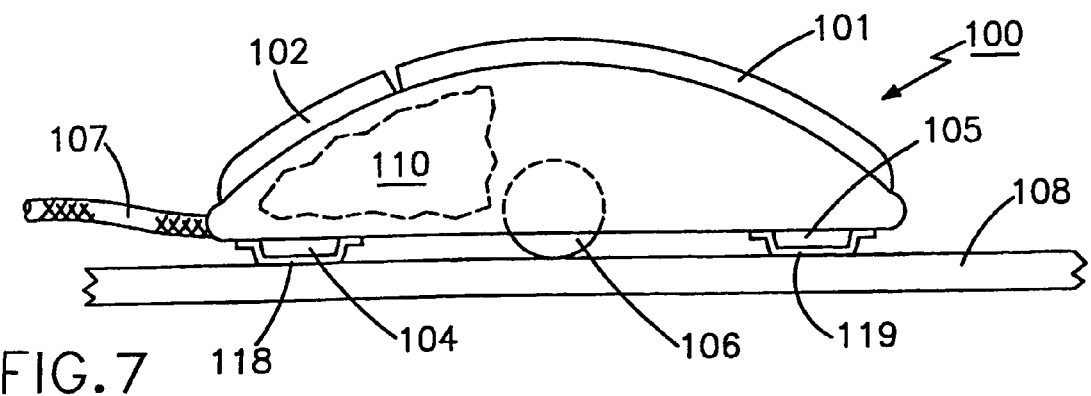
FIG. 7 is a schematic side view of an embodiment of the invention illustrating the addition of increased friction surfaces to the sliding support faces which in turn increase the static and kinetic coefficients of friction between a mouse and a mouse pad.

Referring to FIG. 7, the increase in coefficients of friction is achieved by affixing elements 118 and 119 of a different friction material such as paper-backed adhesive tape to the portions of the relatively smooth protrusions 104 and 105, thereby increasing the static and kinetic coefficients of friction between the mouse 100 and the mouse pad 108.

It will be apparent to one skilled in the art that there will be a wide range of variations within the principles set forth and in addition to the examples listed such mechanisms as the use of hydraulics, pneumatics and viscous fluids may be employed.

Similarly, the principles involving mouse—mouse pad interfaces apply as well to the interfaces of trackballs and other cursor positioning devices.

What has been described is a control principle for a computer mouse that involves adjustably altering a frictional component of the mouse-supporting surface interface.

The invention claimed is:

1. In a manually guided pointing operation in a display interface between a computer and a manually movable mouse input member positioned by a user,
    said interface including an intersection between a curved member on said manually movable mouse input member and a mouse pad stationary surface,
    said interface having associated signal generating circuitry operable to move a cursor in a display in response to relative motion of said curved member with respect to said mouse pad stationary surface, and wherein,
    said curved member has a peripheral surface in tangential contact with said mouse pad stationary surface,
    characterized by an improvement,
    for positioning control of movement of said mouse input member on said mouse pad stationary surface, the addition of a 20–50% increase in weight of said mouse input member,
    whereby said weight operates to enhance a drag type frictional force component, that resists said movement of said mouse on said mouse pad stationary surface;

wherein said 20–50% increase in weight is in the range of 20–50 grams, and wherein said 20–50% weight increase is achieved by means selected from the group consisting of a localized group of metal particles positioned within a housing of said mouse, or a weight member affixed to a housing of said mouse.

2. The improvement of claim 1 wherein said drag type frictional force component is a result of at least one additional addition taken from the group of the addition of a combination of a magnetic member positioned on the surface of said computer mouse that is adjacent to said computer mouse pad and a ferromagnetic sheet positioned in said mouse pad, and an addition of an increase in coefficient of friction between protrusions on the surface of said computer mouse that is adjacent to said computer mouse pad at the surface of said computer mouse pad thereby increasing static and kinetic coefficients of friction between said mouse and said mouse pad.

3. In a computer control interface involving a display and a manually propelled guided relative movement of a mouse member on a surface of a mouse pad, said display having associated signal generating circuitry operable to move a cursor in said display in response to rotational movement of a sphere supporting member of said mouse member in contact with the surface of said mouse pad, said manual propulsion and guidance in said relative movement of said mouse member on said surface of said mouse pad overcoming a drag type resistance frictional force component that operates to resist relative movement of said mouse over said surface of said mouse pad, characterized by:

a positioning control enhancing increment, to said drag type resistance frictional force component that operates to enhance resistance to said relative movement of said mouse member over said surface of said mouse pad, said positioning control enhancing increment to said drag type resistance frictional force being control enhancing means selected from the group consisting of:

the addition of 20–50% weight increase of said mouse member which weight increase is the result of the addition of about 20–50 grams of metal particles positioned in a housing of said mouse, the addition of 20–50% weight increase of said mouse member which weight increase is produced by affixing to a top of a housing of said mouse an element comprising one or more cloth or plastic covered metal discs totaling about 20–50 grams in weight;

the addition of the combination of a magnetic member positioned on the surface of said mouse member adjacent to said surface of said mouse, and a ferromagnetic sheet positioned in said mouse pad and, the addition of friction enhancing elements on protrusions situated on the surface of said mouse member that are adjacent to said mouse pad to increase said drag type resistance movement frictional force thereby increasing static and kinetic coefficients of friction between said mouse and said mouse pad.

4. The improvement of claim 3 wherein said magnetic member is adjustably positioned and said mouse is positioned on rollers away from said mouse pad.

5. In a manually guided pointing operation in a display interface between a computer and a manually movable mouse input member positioned by a user, said interface including an intersection between a curved member on said manually movable mouse input member and a mouse pad stationary surface, said interface having associated signal generating circuitry operable to move a cursor in a display in response to relative motion of said curved member with respect to said mouse pad stationary surface, and wherein, said curved member has a peripheral surface in tangential contact with said mouse pad stationary surface, characterized by an improvement, for positioning control of movement of said mouse input member on said mouse pad stationary surface, means to enhance a drag type frictional force component, that resists said movement of said mouse on said mouse pad stationary surface, said means being selected from the group consisting of the addition of a combination of a magnetic member positioned on the surface of said computer mouse that is adjacent to said computer mouse pad and a ferromagnetic sheet positioned in said mouse pad; or, adding increased friction sliding surfaces to sliding support surfaces by an addition of protrusions on the surface of said computer mouse that are adjacent to said computer mouse pad at the surface of said computer mouse pad, which increases the static and kinetic coefficients of friction between support faces of said mouse and said mouse pad.

* * * * *